United States Patent

[11] 3,582,624

| [72] | Inventors | Friedrich Glantschnig;<br>Marcel Leroux, Neuenhof, Switzerland |
|---|---|---|
| [21] | Appl. No. | 705,334 |
| [22] | Filed | Feb. 14, 1968 |
| [45] | Patented | June 1, 1971 |
| [73] | Assignee | Aktiengesellschaft Brown, Boveri & Cie<br>Baden, Switzerland |

[54] METHOD OF AND APPARATUS FOR APPROXIMATELY PROPORTIONAL REDUCTION OF IMPULSE SERIES
5 Claims, 1 Drawing Fig.

[52] U.S. Cl. ..................................................... 235/92,
235/154
[51] Int. Cl. ........................................................ H03k 21/00
[50] Field of Search ............................................ 235/92, 24,
57, 74; 328/39, 40; 340/347

[56] References Cited
UNITED STATES PATENTS

| 2,824,228 | 2/1958 | Carmichael ................ | 235/92X |
| 2,845,538 | 7/1958 | Havens et al. ............... | 235/92X |
| 2,888,557 | 5/1959 | Schneider.................... | 235/92X |
| 3,328,702 | 6/1967 | Brown ......................... | 328/39 |

*Primary Examiner*—Daryl W. Cook
*Assistant Examiner*—Gary R. Edwards
*Attorney*—Pierce, Scheffler and Parker ABSTRACT: A method of and apparatus for producing an output pulse sequence having a pulse number which is approximately proportional to the pulse number of an input pulse sequence. The device is utilized for digital determination of a measured length determined in a laser interferometer in standard decimal units, the input pulse sequence being derived from the laser light signal interferometrically modulated upon variation of the measured length.

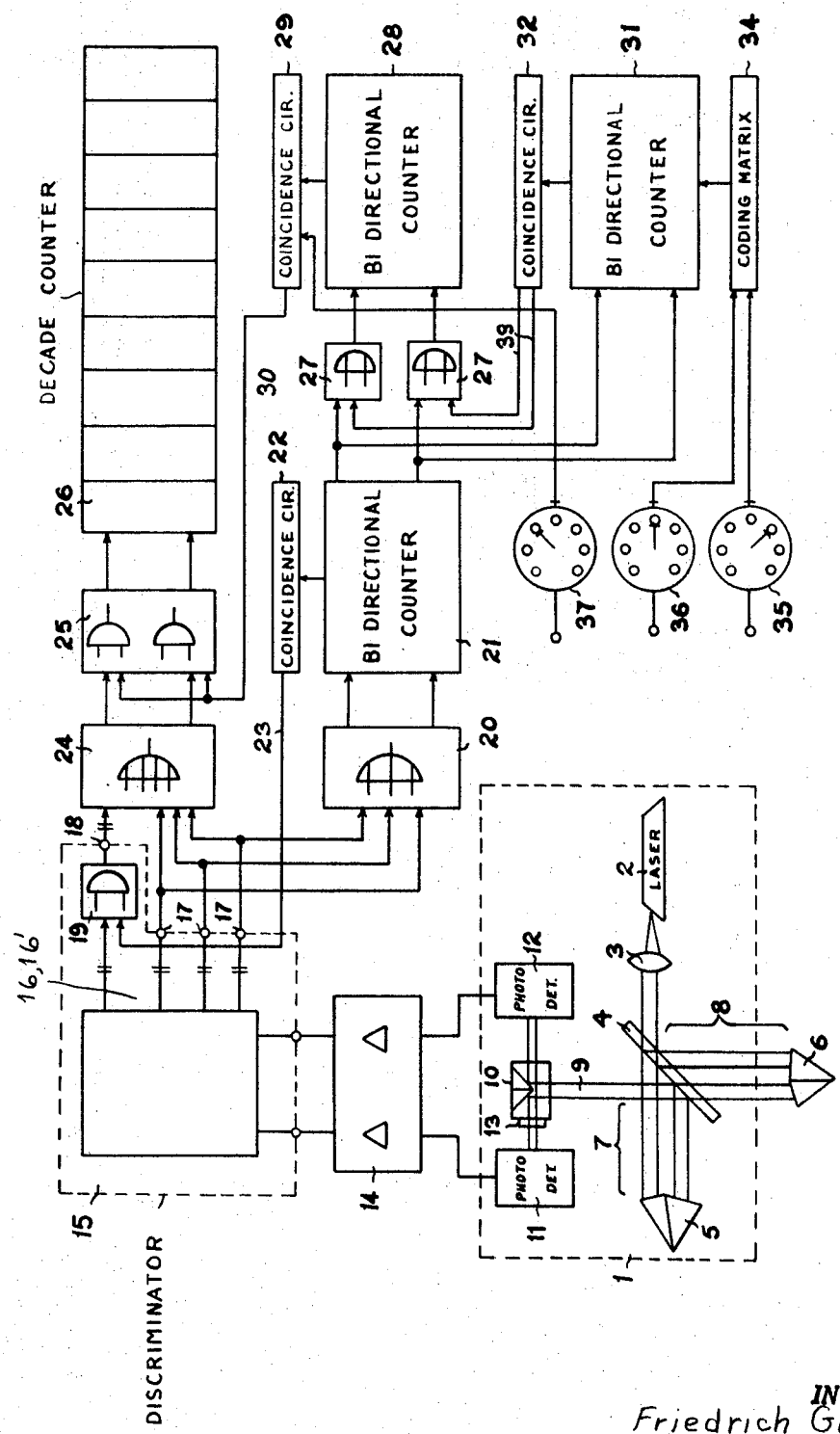

METHOD OF AND APPARATUS FOR APPROXIMATELY PROPORTIONAL REDUCTION OF IMPULSE SERIES

The present invention relates to an improvement in a method of and a device for the production of an output pulse sequence having a pulse number approximately proportional to the pulse number of an input pulse sequence, and to the use of this device for the digital determination of the measured length determined in a laser interferometer in standardized decimal units, the input pulse sequence being derived from the laser light signal interferometrically modulated upon variation of the measured length.

The use of laser light has opened up broad and diversified application for the measurement of lengths with interferometric methods. The gas lasers (chiefly He-Ne) generally used for this furnish a single-wave light of very high coherence which renders possible the production of standing wave trains over relatively great lengths, e.g. 100 m. or more. The wavelengths $\lambda$ of the laser light used are preferably in the range of visible light, e.g. about 6328 ang., permitting the use of a simple, easily adjustable interferometer optical system of high resolution, about 1/10 micron ($\mu$). With each length variation the interferometer furnishes two AC signals phase displaced by 90°, whose period corresponds, depending on the model of the interferometer, to a measured length variation of one-half or one-quarter wavelength $\lambda$ of the laser light.

What is here concerned, therefore, is a digital-incremental measuring system where the total measured length is represented digitally by a sign-correct summing of the digital increments. For practical reasons, however, it is desirable to represent the measured length in standardized decimal numbers, e.g. in integral multiples of 0.1 $\mu$m. With such a representation in standardized numbers, moreover, it must be taken into account by a corresponding correction that these increments vary somewhat in the same manner as the wavelength of the laser light with the pressure, temperature, and humidity of the air in the measured distance.

To determine the standardized decimal numbers, in some known devices there is derived from the alternating current signals furnished by the interferometer a pulse sequence whose pulse spacing corresponds to a measured length variation of $\lambda/8$ or respectively $\lambda/16$.

This pulse sequence is summed in a counter according to a first known method, the counter setting being multiplied by a conversion factor. To obtain the required accuracy, the multiplier used for this must be rated in all registers for the full number of digits, and this leads to a relatively high circuit cost.

According to a second known method, each pulse of this pulse sequence brings about the addition or respectively the subtraction of the measured length increment corresponding to a pulse spacing, in an adding register. Each overflow of the adding register is counted in a decimal counter, whose counting value indicates directly the measured length variation, e.g. in multiples of 0.1 $\mu$m. Although this method requires less circuit expense than the first named, it has the disadvantage, on the other hand, that the maximum measuring frequency is limited according to the time required for the addition cycles.

The principal object of the present invention is to provide a method of, and a device for, the production of an output pulse sequence whose pulse number is proportional to that of an input pulse sequence, which advantageously serves for the decimally standardized representation of interferometrically determined measured lengths, and which at high maximum measuring frequency requires a much lower circuit expense than the known methods.

The method according to the invention is characterized by periodical suppression of some pulses of the input pulse sequence for the formation of a reduced input pulse sequence, and by formation of an output pulse sequence with periodical insertion of some of the initially suppressed pulses of the input pulse sequence.

The invention is explained in detail below with reference to an example. The basic idea of the method according to the invention consists in producing, from an input pulse sequence furnished, for example, by an interferometer, by periodical suppression of some pulses, an output pulse sequence whose pulse number $g$ ($g \cong \alpha_o f_o$) becomes approximately proportional to the pulse number $f_o$. By suitable selection of the suppressed pulses it can be achieved that the error of the pulse number of the output pulse sequence never becomes greater than one pulse. $\alpha_o$ is the proportionality factor expressing the number of tenths of a micron which correspond to one-eighth of the wavelength of the laser light.

Let the determination of the rules of selection be illustrated for the case $1 > \alpha_o > 1/2$. In this case it suffices, for the determination of a first approximation, to find those maximum positive integers $r$ and $s$ for which the inequality $$r/r-1 > 1/\alpha_o > rs/s(r-1)+1 \text{ exists.}$$

In a first process step, there is formed from the input pulse sequence, by suppression of all its $mr^{th}$ pulses for which (at integral $m$ and $n$) $m + ns$, an intermediate pulse sequence with the pulse number $f_1 \cong f_o s(r-1) + 1/rs$ which may be regarded as a first approximation of the output pulse sequence. One then obtains the output pulse sequence by periodical suppression of some pulses of the intermediate pulse sequence in a second process step. This subdivision has the further advantage that small variations in the proportionality factor $\alpha_o$, caused by pressure or temperature variations when used for example in connection with a laser-interferometer, may be taken into consideration only in the second process step and therefore the device corresponding to the first step can be laid out with fixed wiring.

An example of the device and its use according to the invention will now be shown with reference to the accompanying drawing.

The laser interferometer 1 comprises a gas laser 2 which emits a coherent light beam 3, whose wavelength $\lambda = 0.632828296$ $\mu$m (at 21° C. and 725 Torr). The light beam 3 is divided in a dividing plate 4 into two beams, each of which impinges on a "Triple Prism" 5, 6 at the end of the reference distance 7 or respectively the measured distance 8. The Triple Prisms 5, 6 act like mirrors and reflect the beams parallel to their directions of incidence back to the dividing plate 4, where, with interference, they are combined in an intensity-modulated beam 19. This beam 19 is split in a set of prisms 10 into two partial beams, which are supplied to a photodetector for each, 11, 12. In one of the partial beams a phase plate 13 is arranged, which brings about a phase displacement of 90° between the light signals received by the photodetectors 11, 12.

These light signals are transformed in the photo detectors 11 and 12 into alternating current (AC) signals whose period corresponds to a measured length variation of one-half the laser light wavelength $\lambda$ and which are supplied via the photoamplifier 14 to a discriminator circuit 15. In the discriminator circuit these AC signals are at first transformed into rectangular voltage signals, from which there are derived, by logical linking depending on the phase position of the incoming signals, that is, depending on whether the measured length is increasing or decreasing, via a first or a second four-phase line 16 and 16', per period of the AC signal, successively four pulses of which the input pulse sequence is composed. According as the measured length is increasing or decreasing, the control of the circuit components which follow the direction discriminator 15 and which will be detailed hereinafter device occurs via the four-phase lines 16 or 16', only one of which is indicated in the drawing for reasons of greater clarity. The structure of the direction discriminator 15 has not been detailed herein but this can be found in an article by the coapplicant Friedrich Glantschnig entitled "High-Resolution Digital Devices for Distance Measurement" published in the Brown Boveri Review, Vol. 54, No. 4 (Apr., 1967) at pages 172—179, particularly FIG. 3 appearing on page 175.

Each of the pulses of the input pulse sequence corresponds to a measured length variation of $\lambda/8 = 0.079103537$ $\mu$m. With the requirement that each pulse $r$ of an output sequence to be formed corresponds as a mean to a measured length variation of 0.1 μm, the proportionality factor $\alpha_o=0.79103537$. From the above stated inequality there then results $r=4$ and $s=6$.

To carry out the instruction given above of suppressing all $mr^{th}$ pulses of the input pulse sequence for which (at integral $n$) $m \neq ns$, the pulses of the input pulse sequence are grouped together in the circuit of the directional discriminator 15 in groups of $r$ pulses, and the $(r-1)$ first pulses of each group are supplied to a first output 17, and the $r^{th}$ pulse i.e. the last pulse in each group is supplied via a first gate circuit 19 to a second output 18 of the discriminator circuit 15.

In the specific case of $r=4$, the grouping of the input pulse sequence is effected in simple manner in that the first three phases of each line 16, 16' serve as first output 17 of the discriminator circuit 15, while the fourth phases are conducted via the first gate circuit 19 to the second output 18. The first output 17 is connected via an OR gate 20 to a first bidirectional counter 21, which counts forward or back according as the measured length increases or decreases, and which upon reaching the theoretical counter setting of $s(r-1)$ $=18$ established in a coincidence circuit 22, furnishes a reset pulse for the counter and, via line 23, an opening pulse for the first gate circuit 19, so that it lets through the $rs=24^{th}$ pulse of the input pulse sequence. The two outputs 17 and 18 of the discriminator circuit 15 are connected to a summing circuit 24 which furnishes an intermediate pulse sequence which represents a first approximation of the output pulse sequence and whose pulse number $f_1$ is approximately $s(r-1)+1$ $/sr f_o$. Now this pulse number $f_1$ is in turn approximately proportional to the pulse number $g$ of the output pulse sequence: $g$ approximately $=\alpha_1 f_1$, where $$\alpha_1 = \frac{sr}{s(r-1)+1} \alpha_0$$

. This proportionality factor $\alpha_1$, which differs little from unity, varies slightly with the temperature and atmospheric pressure analogously as the wavelength λ of the laser light.

For the formation of the output pulse sequence, the summing circuit 24 is followed by a second gate circuit 25, which transfers the output pulse sequence to the decade counter 26, which retains the measured length in multiples of 0.1 μm.

To determine the characteristic values for the control of this second gate circuit 25, one conceives $\alpha_1$ represented by a fraction of the form $$\alpha_1 = \frac{t[s(r-1)+1]}{t[s(r-1)+1]+1}$$

where $t=t(t,p)$ is to be regarded as a function of the temperature ($t$) and atmospheric pressure ($p$).

Now as $\alpha_{10}$ there is defined that value of $\alpha_1$ valid for a mean temperature and a mean atmospheric pressure for which $t=t_o$ is an integer. In our particular case this is attained with $t_o=66$ for a temperature of 21° C. and 725 Torr. For the value $\alpha_1 = \alpha_{10}$ and $t=t_o$, the output pulse sequence is formed from the intermediate pulse sequence by periodical suppression of every $\{t_o[s(r-1)+1]+1\}$-th pulse, that is, in our case, every 1255th pulse of the intermediate pulse sequence. The control of this suppression is effected by means of a second bidirectional counter 28 which follows the first counter 21 via a third gate circuit 27 and which again counts forward or back according as the measured length increases or decreases and which, upon reaching the theoretical counter setting $t_o=66$ retained in the coincidence circuit 29, supplies a reset pulse for the counter and, via line 30, a suppression pulse to the second gate circuit 25. For values of $\alpha_1 \neq \alpha_{10}$ (or respectively $t \neq t_o$) still another correction is necessary. For this purpose, first there are determined for some interesting values of atmospheric pressure and temperature matching correction factors $$x = \frac{t_o}{t-t_o}$$

rounded up or down to integers from the respective values of $\alpha_1 (p,t)$ or respectively $t (p,t)$. The correction is effected in the device by means of a bidirectional correction counter 31 following the first counter 21 and operating in parallel with the counter 28, and which upon reaching the correction factor $x$ retained in the coincidence circuit 32 as theoretical counter setting, furnishes a reset pulse for the counter which triggers in addition, via the lines 33 and the third gate circuit 27, depending on the sign of the correction factor $x$, the suppression of a pulse to be supplied to the counter 28 or the feeding of an additional pulse into the counter 28. In the practice this has the effect that the theoretical counter setting of counter 28 is increased or reduced by 1 periodically with the intermediate pulse sequence.

The input of the correction values $x$ is effected via a permanently wired coding matrix 34 by means of input switches 35 and 36 whose positions correspond to specific values of temperature and atmospheric pressure.

According to a simplified variant, the correction factors $x$ are taken from a table and fed into the coincidence circuit directly.

The temperature-dependent length variation of the object to be measured is taken into consideration by variation of the theoretical counter setting $t_o$ of the second counter 28. For the system described, and for steel as material of the measured object, $t_o$ is varied by ± 1 per degree C. This variation of the theoretical counter setting is effected through an input switch 37 and the coincidence circuit 29 for each cycle of the counter 28 by suppression of a corresponding number of pulses supplied to it by a corresponding additional supply of pulses.

We claim:

1. Apparatus for reducing an input pulse sequence with a pulse number $f_o$ and forming an output pulse sequence with a pulse number $g \cong \alpha_o \cdot f_o$ wherein $\alpha_o$ is a proportionality factor falling within the limits $1 > \alpha_o > 1/2$ which comprises:

a discriminator circuit grouping said input pulse sequence in groups of $r$ pulses and which delivers $r-1$ first pulses of each group to a first output and the $r^{th}$ pulse via a first gate circuit to a second output, a summation circuit connected to said first and second outputs from said discriminator circuit for forming an intermediate pulse series, a first bidirectional counter connected to said first output, said counter delivering an opening pulse to said first gate circuit after reaching a nominal counter reading $s(r-1)$ wherein $r$ and $s$ are the highest whole numbers for the relationship $r/r-1 > 1 / \alpha_o > Asr/s(r-1)+1$, a second gate circuit connected to the output side of said summation circuit which produces said output pulses, a second bidirectional counter connected to the output of said first counter via a third gate circuit, said second counter delivering a suppression pulse to said second gate circuit after reaching its nominal counter reading, and a correction circuit connected to the output of said first counter for periodically suppressing via said third gate circuit individual pulses to be fed to said second counter or which feeds to it additional pulses.

2. Apparatus as defined in claim 1 for forming an output pulse sequence wherein said proportionality factor $\alpha_o$ is a function of external parameters and wherein said correction circuit includes a correction bidirectional counter also connected to the output of said first counter and operating in parallel with said second counter, said correction counter producing a reset pulse when it reaches a nominal counter reading equal to the value of a correction factor $x$ determined by said external parameters, said reset pulse being fed via said third gate circuit to suppress an impulse fed to said second counter or to feed an additional pulse to said second counter dependent upon the sign of said correction factor.

3. Apparatus as defined in claim 2 for forming an output pulse sequence wherein said correction circuit further includes a coding matrix for supplying said correction factor to said correction counter, said coding matrix being fed with selected values of said external parameters from selective switching means.

4. Apparatus as defined in claim 1 for forming an output pulse sequence wherein said input pulse sequence to said discriminator circuit is constituted by two alternating current voltage signals displaced 90° in phase derived from the output of a laser-interferometer, the period of said alternating current voltage signals corresponding to a measured length variation of one-half the wavelength λ of the laser light, wherein said discriminator circuit delivers a pulse sequence with a pulse interval of λ/8 and a control quantity derived from the phase position of said alternating current voltage signals which determines the counting direction of said first and second bidirectional counters, and which further includes a decade counter connected to the output side of said second gate circuit for digitally indicating the variation in the length measured by said laser-interferometer.

5. Apparatus as defined in claim 2 wherein air pressure and temperature constitute the said external parameters of the proportionality factor corresponding to the wavelength of laser light.

PO-1050
(5/69)

UNITED STATES PATENT OFFICE
CERTIFICATE OF CORRECTION

Patent No. 3,582,624          Dated June 1, 1971

Inventor(s) Friedrich Glantschnig and Marcel Leroux

It is certified that error appears in the above-identified patent and that said Letters Patent are hereby corrected as shown below:

In the specification, column 4, line 48, the following equation appears:

$$"r/r-1 > 1/\alpha_o > Asr/s(r-1)+1"$$

which should read:

$$"r/r-1 > 1/\alpha_o > sr/s(r-1)+1"$$

Signed and sealed this 7th day of September 1971.

(SEAL)
Attest:

EDWARD M. FLETCHER, JR.          ROBERT GOTTSCHALK
Attesting Officer                   Acting Commissioner of Patents